United States Patent
Hunt et al.

(10) Patent No.: US 7,560,658 B2
(45) Date of Patent: Jul. 14, 2009

(54) METHOD FOR FORMING NANOSCALE FEATURES

(75) Inventors: Alan J. Hunt, Plymouth, MI (US); Gerald Mourou, Ann Arbor, MI (US); Ajit P. Joglekar, Ann Arbor, MI (US); Edgar Meyhofer, Ann Arbor, MI (US); John A. Nees, Ann Arbor, MI (US); Greg Spooner, Kensington, CA (US)

(73) Assignee: The Regents Of The University Of Michigan, Ann Arbor, MI (US)

( * ) Notice: Subject to any disclaimer, the term of this patent is extended or adjusted under 35 U.S.C. 154(b) by 654 days.

(21) Appl. No.: 11/167,463

(22) Filed: Jun. 27, 2005

(65) Prior Publication Data
US 2006/0237405 A1    Oct. 26, 2006

Related U.S. Application Data

(62) Division of application No. 10/765,656, filed on Jan. 26, 2004, now Pat. No. 6,995,336.

(60) Provisional application No. 60/443,431, filed on Jan. 29, 2003.

(51) Int. Cl.
*B23K 26/16* (2006.01)
*B23K 26/40* (2006.01)

(52) U.S. Cl. .................... 219/121.61; 219/121.69; 204/192.32; 117/92

(58) Field of Classification Search ................ 219/121.65–121.72, 121.84, 121.6, 121.61; 117/92; 204/192.1, 192.32–192.37; 216/65
See application file for complete search history.

(56) References Cited

U.S. PATENT DOCUMENTS

| | | | |
|---|---|---|---|
| 5,235,606 A | | 8/1993 | Mourou et al. |
| 5,314,829 A | * | 5/1994 | Coles .................. 436/165 |
| 5,496,682 A | * | 3/1996 | Quadir et al. ........... 430/269 |
| 5,534,328 A | * | 7/1996 | Ashmead et al. ........ 428/166 |
| 5,541,947 A | | 7/1996 | Mourou et al. |
| 5,656,186 A | | 8/1997 | Mourou et al. |
| 5,726,855 A | | 3/1998 | Mourou et al. |
| 5,757,839 A | | 5/1998 | Biswal et al. |
| 5,786,560 A | * | 7/1998 | Tatah et al. ........... 219/121.77 |
| 5,844,288 A | | 12/1998 | Mourou et al. |
| 6,146,103 A | | 11/2000 | Lee et al. |
| 6,146,375 A | | 11/2000 | Juhasz et al. |

(Continued)

OTHER PUBLICATIONS

Joglekar, A.P. et al., "A study of the deterministic character of optical damage by femto-second laser pulses and applications to nanmachining," Appl. Phys. B 77, pp. 25-30 (published online Jul. 30, 2003).

(Continued)

*Primary Examiner*—Samuel M Heinrich
(74) *Attorney, Agent, or Firm*—Harness, Dickey & Pierce, P.L.C.

(57) ABSTRACT

Here is presented a versatile technique for machining of nanometer-scale features using tightly-focused ultrashort laser pulses. By the invention, the size of features can be reduced far below the wavelength of light, thus enabling nanomachining of a wide range of materials. The features may be extremely small (<20 nm) and are highly reproducible.

10 Claims, 12 Drawing Sheets

U.S. PATENT DOCUMENTS

| | | | |
|---|---|---|---|
| 6,150,630 | A | 11/2000 | Perry et al. |
| 6,160,252 | A | 12/2000 | Mourou et al. |
| 6,333,485 | B1 | 12/2001 | Haight et al. |
| RE37,585 | E | 3/2002 | Mourou et al. |
| 6,432,630 | B1 | 8/2002 | Blankenstein |
| 6,544,734 | B1 | 4/2003 | Briscoe et al. |
| 6,552,301 | B2 * | 4/2003 | Herman et al. ......... 219/121.71 |
| 6,664,498 | B2 | 12/2003 | Forsman et al. |
| 6,770,322 | B1 | 8/2004 | Moles |
| 7,332,030 | B2 * | 2/2008 | Bruel ......................... 117/91 |
| 2002/0070352 | A1 * | 6/2002 | Allan et al. ............... 250/492.1 |
| 2003/0003619 | A1 | 1/2003 | Winer et al. |
| 2003/0127441 | A1 * | 7/2003 | Haight et al. ........ 219/121.84 |
| 2003/0235385 | A1 * | 12/2003 | Taylor et al. ................ 385/129 |
| 2004/0042937 | A1 | 3/2004 | Bentsen et al. |

OTHER PUBLICATIONS

Joglekar, A.P. et al., "Optics at critical intensity: Applications to nanomorphing," PNAS, vol. 101, No. 16, pp. 5856-5861 (Apr. 20, 2004).

Li, Y. et al., "Three-dimensional hold drilling of silica glass from the rear surface with femtosecond laser pulses," Optics Letters, vol. 26, No. 23, pp. 1912-1914 (Dec. 1, 2001).

Marcinkevicius, A. et al., "Femtosecond laser-assisted three-dimensional microfabrication in silica," Optics Letters, vol. 26, No. 5, pp. 277-279 (Mar. 1, 2001).

* cited by examiner

DAMAGE ALONG THE Z AXIS

METHOD FOR FORMING NANOSCALE FEATURES

CROSS-REFERENCE TO RELATED APPLICATIONS

This application is a divisional of U.S. patent application Ser. No. 10/765,656 filed on Jan. 26, 2004, which itself claims benefit of U.S. Provisional Application No. 60/443,431, filed on Jan. 29, 2003. The disclosures of the above applications are incorporated herein by reference.

GOVERNMENT'S RIGHT CLAUSE

This invention was made with government support provided by the National Science Foundation (Grant Nos. 8920108 and 0133659). The government has certain rights in the invention.

FIELD OF THE INVENTION

This invention relates generally to methods utilizing lasers for modifying internal and external surfaces of material such as by ablation or changing properties in structure of materials. This invention may be used for a variety of materials.

BACKGROUND OF THE INVENTION

Laser induced breakdown of a material causes chemical and physical changes, chemical and physical breakdown, disintegration, ablation, and vaporization. Lasers provide good control for procedures which require precision such as inscribing a micro pattern. Pulsed rather than continuous beams are more effective for many procedures, including medical procedures. A pulsed laser beam comprises bursts or pulses of light which are of very short duration, for example, on the order of 10 nanoseconds in duration or less. Typically, these pulses are separated by periods of quiescence. The peak power of each pulse is relatively high often on the order of gigawatts and capable of intensity on the order of $10^{13}$ w/cm$^2$ or higher. Although the laser beam is focused onto an area having a selected diameter, the effect of the beam extends beyond the focused area or spot to adversely affect peripheral areas adjacent to the spot. Sometimes the peripheral area affected is many times greater than the spot itself. This presents a problem, particularly when high precision is required, or where tissue is affected in a medical procedure. In the field of laser machining, current lasers using nanosecond pulses cannot produce features with a high degree of precision and control, particularly when nonabsorptive wavelengths are used.

In U.S. Pat. No. 5,656,186, Mourou et al., provided a method to localize laser induced breakdown, and provided a method to induce breakdown in a preselected pattern in a material or on a material. In U.S. Pat. No. 5,235,606, Mourou et al., described a CPA (chirped-pulse amplification) system for use in such method.

Mourou et al. showed that when matter is subjected to focused high-power laser pulses localized plasmas are generated by optical breakdown. More specifically, the Mourou U.S. Pat. No. 5,656,186 showed a method for laser induced breakdown of a material with a pulsed laser beam where the material is characterized by a relationship of fluence breakdown threshold ($F_{th}$) versus laser beam pulse width (T) that exhibits an abrupt, rapid, and distinct change or at least a clearly detectable and distinct change in slope at a predetermined laser pulse width value. The method comprises generating a beam of laser pulses in which each pulse has a pulse width equal to or less than the predetermined laser pulse width value. The beam is directed to a material where laser induced breakdown is desired. The technique can produce features smaller than the spot size and Rayleigh range due to enhanced damage threshold accuracy in the short pulse regime.

Mourou et al. departs from the conventional thinking concerning optically induced dielectric breakdown relationship to pulse duration, demonstrating the dependence weakening below certain pulse width value. The small pulse energy and short pulse duration associated with optical breakdown according to Mourou prevents collateral damage from heating, and associated undesirable mechanical phenomena.

A major barrier to creating nanotechnology is that fabrication of nanometer scale features requires complex processes. Ultrashort pulsed lasers have demonstrated potential for fabricating sub-micron features in diverse substrates by taking advantage of the sharp boundaries of optical breakdown created by femtosecond pulses of laser light. The present invention reveals a new method for providing a new mechanism for optical breakdown.

SUMMARY OF THE INVENTION

The present invention enables a new regime of robust, ultra-high-precision laser machining (UHPLM) where features are reduced by more than an order of magnitude. Here is presented a versatile technique for machining of nanometer-scale features using tightly-focused ultrashort laser pulses. By the invention, the size of features can be reduced far below the wavelength of light, thus enabling nanomachining of a wide range of materials. The features may be extremely small (<20 nm), are highly reproducible and are independent of the polarization of the light. This generalized process for nanoscale machining holds great promise for applications including MEMS construction and design, microelectronics, fabricating optical wave-guides and memory, microfluidics, materials science, microsurgery, and creating structures to interface with cells and biological molecules. The present invention will also anticipate significant impact in the biological sciences, enabling targeted disruption of nanoscale cellular structures and genetic material.

The present invention achieved two orders of magnitude further reduction in optical breakdown pulse energy by carefully approaching the threshold energy at the small (~400 nm) focal spot produced by high numerical aperture (NA) objectives.

This reduction arises not by further decreases in pulse widths, but by decreasing the focal spot size using high numerical aperture objectives, and carefully controlled approach to the optical damage energy threshold. The reduction of the photodisrupted zone size from the initial nanosecond studies to work by the present invention is at least three orders of magnitude, and here is shown to be over five orders of magnitude.

Radiation damage beyond the region of optical breakdown is insignificant because the extremely short duration of a pulse; the total energy delivered is negligible in regions where the intensity is insufficient to produce nonlinear events. For comparison, the energy delivered to a cell in one second during conventional differential interference contrast microscopy (DIC) is on the order of millijoules. The relatively delicate cell easily survives this, and this is vastly more energy than is used by the present invention for UHPLM; optical breakdown at nanometer dimensions requires about a nanojoule of energy, a difference of over six orders of magnitude.

Likewise, although femtoseconds pulses can induce apoptosis-like death in mammalian cells due to generation of reactive oxygen species, this requires cells to be exposed to ~320× $10^6$ pulses, each ~90 pJ, or about 28 mJ of laser energy (Konig et al., 1999; Tirlapur et al., 2001). This is more than seven orders of magnitude more energy than that delivered for UHPLM, where features are induced by a single laser pulse.

Thus, it is shown here that the laser intensity can be selected so that only a small section across the beam, even at a diffraction limited focus, exceeds the required intensity for optical breakdown (as shown in FIGS. 1, 2 and 3). This "thresholding" effect can be exploited because of the deterministic nature of optical breakdown observed for sub-picosecond pulses. Here the energy is highly focused and extremely close to threshold pulse energy for optical breakdown (~5%), yet even at the most minute scales (<20 nm), the holes have sharply delineated edges and are highly reproducible. This indicates a virtually deterministic dependence on pulse energy and laser intensity, so that only a small, sharply defined section of even a gaussian diffraction-limited focus exceeds the required breakdown intensity. There is a non-linear relation so that the breakdown probability shows a very high order dependence on the light energy.

In one aspect, the beam is focused by selecting a numerical aperture objective for focusing sufficient to define a spot in or on the material so that the desired feature size is obtained when laser-induced optical breakdown causes ablation of an area less than about 10% of the area of the spot. The beam is directed to a point at or beneath the surface of a material where laser induced breakdown is desired. Preferably the new numerical aperture objective is selected to define an area such that the desired feature size may be obtained when not less than 1% of the area of a gaussian diffraction-limited focus exceeds energy density equal to or greater than the threshold.

In one aspect, the ablation forms a feature having a maximum dimension which is over an order of magnitude smaller than the wavelength of the light. Desirably a plurality of features are formed in the material characterized by a variability in the largest dimension which is less than 10%. Preferably a plurality of features are formed in the material characterized by a variability in the largest dimension which is less than 5%.

Desirably the wavelength is in a range of 400 to 600 nanometers, more desirably the wavelength is in a range of 500 to 550 nanometers, and preferably the wavelength is 527 nanometers. Desirably the feature is less than 250 nanometers; more desirably less than 100 nanometers; and preferably 20 nanometers or less; and most preferably 16 nanometers or less.

Desirably the pulse width is a picosecond or less. Preferably the pulse width is 600 femtoseconds.

In one aspect, the focusing objective is an oil immersion objective lens.

The method is operable for essentially any material, transparent, opaque, biologic, tissue, glass, and metal.

In one aspect, the invention may be understood by further defining the damage threshold energy density: the laser energy delivered to an area must exceed a sharply defined threshold to cause material damage/ablation. This threshold is related to, but not the same, as the threshold fluence for ionization and the fluence breakdown threshold. The threshold energy density is invariant across a material, even at the nanometer scale, and it is this aspect that enable ultra-high-precision laser machining of reproducible nanoscale features with sharply-defined edges.

In one aspect, the method of the invention provides a laser beam which defines a spot that has a lateral gaussian profile characterized in that fluence at or near the center of the beam spot is greater than the damage threshold energy density whereby the laser induced breakdown is ablation of an area within the spot. The maximum intensity is at the very center of the beam waist. The beam waist is the point in the beam where wave-front becomes a perfect plane; that is, its radius of curvature is infinite. This center is at radius R=0 in the x-y axis and along the Z axis, Z=0. This makes it possible to damage material in a very small volume centered on Z=0, R=0. Thus it is possible to make features smaller than spot size in the x-y focal plane and smaller than the Rayleigh range (depth of focus) in the Z axis. It is preferred that the pulse width duration be in the femtosecond range although pulse duration of higher value may be used so long as the value is less than the pulse width defined by an abrupt or discernable change in slope of fluence breakdown threshold versus laser beam pulse width.

In one aspect, the method of the invention provides a laser beam which defines a spot that has a lateral profile characterized in that fluence varies within the beam spot and is greater than the damage threshold energy density whereby the laser induced breakdown is ablation of an area within the spot. The intensity peak or peaks are distributed across the beam waist. The beam waist is the point in the beam where wave-front becomes a perfect plane; that is, its radius of curvature is infinite.

It is preferred that the beam have an energy in the range of 3 nJ (nanojoules) to 3 microjoule and that the beam have a fluence in the range of 2 $J/cm^2$ to 2000 $J/cm^2$ (joules per centimeter square). It is preferred that the wavelength be in a range of 350 nm (nanometers) to 1.1 μm (micron).

As can be seen, the present invention takes a new approach as compared to the prior work of U.S. Pat. No. 5,656,186, Mourou et al., which showed that when matter is subjected to focused high-power laser pulses localized plasmas are generated by optical breakdown. As shown in this present invention, optical breakdown proceeds by Zener ionization followed by a combination of Zener and Zener-seeded avalanche ionization, in which initial (seed) unbound electrons in the target material are accelerated by the extreme electric field of a short pulse laser to create a cascade of free electrons through collisions. This even occurs in transparent materials, which become opaque light absorbers above a certain irradiance threshold. Optical breakdown shows a highly non-linear dependence on intensity. This non-linearity makes it possible to limit optical breakdown to regions smaller than the spot-size of the focused laser; the laser power can be selected so that only a small section of a gaussian diffraction-limited focus exceeds the required intensity. This "thresholding" effect is especially effective when exploiting the nearly deterministic nature of optical breakdown observed for sub-picosecond pulses thus allowing fabrication of sub micron features. Here such benefits are further extended by new concepts for focusing, pulse duration, fluence, and intensity, and the invariance of damage threshold energy density even at the nanometer scale. This is not predicted by previous work or theory, and precipitates a theoretical framework that indicates that contrary to common belief multiphoton ionization is not involved, and ultra-high-precision is made possible by a mechanism dominated by Zener-seeded impact ionization.

In view of the above and in further aspects, the present invention provides a method of laser-induced breakdown of a material which comprises, first, depositing energy within a material to extract electrons from a valence band providing unbound electrons with an electron density being higher at one or more select locations of first absorption volume as compared to one or more non-select locations of the first absorption volume; and, then, depositing added energy within the first absorption volume, preferentially at each of the select locations causing contraction of the first absorption volume to a smaller second absorption volume defined by one or more regions of the material corresponding to respectively the one or more select locations, thereby causing damage of material selectively within the second absorption volume, essentially without collateral damage to the balance of material in the first absorption volume. Preferably the added energy is optical energy deposited to a penetration depth sufficient to cause electron density of at least $10^{19}/cm^3$; more desirably, an electron density in a range of $10^{19}/cm^3$ to $10^{23}/cm^3$; and most preferably, an electron density of $10^{23}/cm^3$.

In a preferred aspect of the present invention, the initial depositing of energy defines a first absorption volume having a peripheral extent or periphery where select regions are inward of the periphery. The added energy is deposited at the selection regions. Damage occurs selectively to material within the second absorption volume corresponding to the one or more select regions. In a further feature, a single pulse of optical energy having a modulated intensity profile is used to cause the initial and subsequent damage resulting in the selectively damaged areas.

In a further feature, the present invention provides a method of producing one or more features of micrometer size or less in a material that comprises generating at least one laser pulse of femtosecond duration or less and directing the pulse to the material to cause damage in the presence of an entraining fluid that entrains debris caused by the damage. The entraining fluid is selected to entrain debris caused by laser-induced damage by having a density sufficient to cause the entrainment, movement along the surface of the material to cause the entrainment, the fluid being a moving gas, an entraining liquid, whether moving or not, or as a quiescent bath. The fluid has density sufficient to cause the entrainment or at least momentum sufficient to cause the entrainment. In a further feature, the fluid may be selected to impart the desired characteristic to the material being damage.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 2 also shows an illustration of how an ultrashort laser pulse can create an ablation localized to a region smaller than the light resolution limit.

FIG. 3A is a schematic illustration of beam profile along the longitudinal Z axis and showing precise control of damage—dimension along the Z axis. FIG. 3B is a schematic illustration of beam profile along the longitudinal Z axis and showing precise control of damage—dimension along the Z axis.

FIG. 1 shows a directly diode-pumped Nd:glass, CPA laser system (Intralase, City) which was focused through the objective of an inverted microscope.

FIG. 7A is at wavelength of 1053 nm at 1.3 NA on glass. FIG. 7B is for 1053 nm length focused on glass by a 0.65 NA objective.

DETAILED DESCRIPTION OF THE PREFERRED EMBODIMENTS

The following description of the preferred embodiment(s) is merely exemplary in nature and is in no way intended to limit the invention, its application, or uses.

Figure 1:
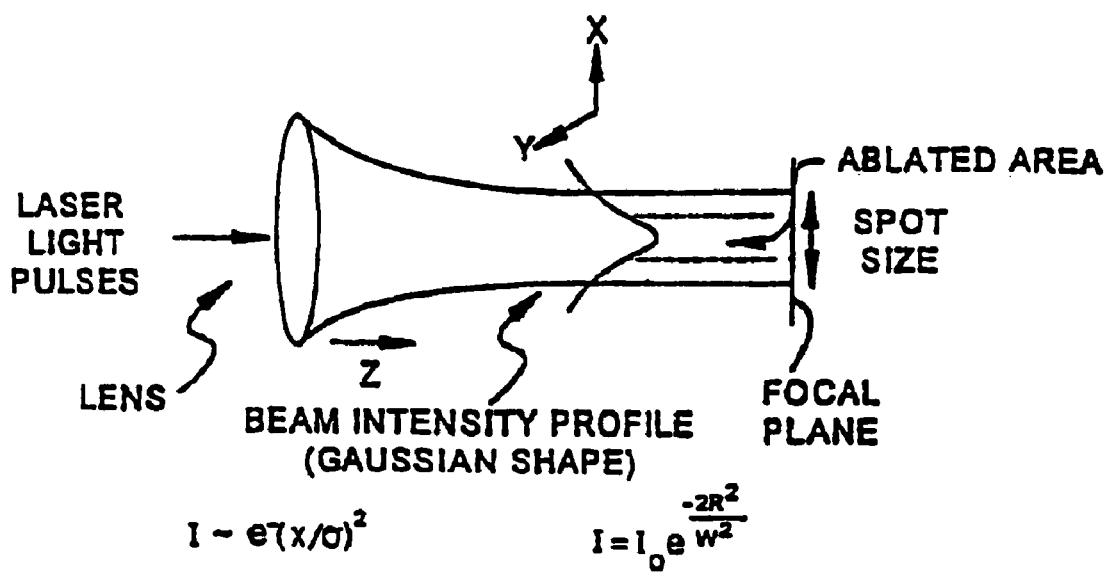
FIG. 1 shows the radial position on the beam where the fluence is at threshold, and is a schematic illustration of a beam intensity profile with gaussian shape.
Figure 2:
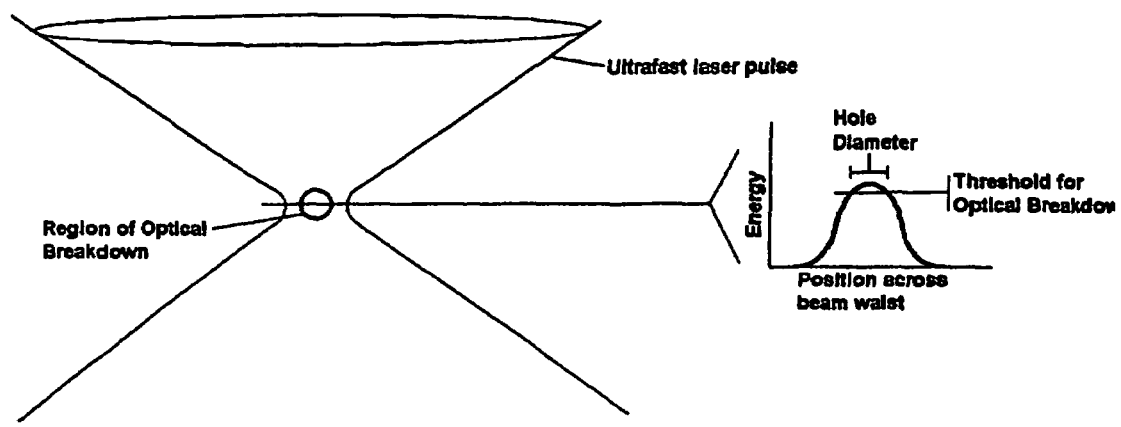
FIG. 2 shows the laser intensity at the focus can be selected so that only a small section of a gaussian diffraction-limited focus exceeds the required intensity.

The present invention provides a method to shape an optical pulse in space and time to achieve precise deterministic effects in smaller features heretofore not previously contemplated. See FIG. 4 of the present invention showing single spot and multiple spot patterns prepared by a single optical pulse shaped in space and time providing one or more regions of increased unbound electron density. In order to foster an understanding of the present invention developments, it is useful to understand principles associated with FIGS. 1, 2 and 3. FIGS. 1, 2 and 3 are schematic illustrations of a beam intensity profile showing that for laser micro-machining with ultrafast pulse, only the peak of the beam intensity profile exceeds the threshold intensity for ablation/machining.

FIG. 3 shows the radial and axial position on the beam where the fluence is at threshold. Ablation, then, occurs only within a radius. It is evident that by properly choosing the incident fluence, the ablated spot or hole can in principle be smaller than the spot size. This concept is shown schematically in FIG. 2. Although the data described herein is for an exemplary 600 fs pulse, this threshold behavior is exhibited in a wide range of pulse widths. However, sub spot size ablation is not possible in the longer pulse regimes, due to the dominance of thermal diffusion as will be described below.

The present invention demonstrates that by, producing a smaller spot size which is a function of numerical aperture and wavelength, and approaching close to the threshold, even smaller features are machined. Furthermore, the axial dimension is substantially reduced to become approximately equal to radial, so material is ablated within an approximately spherical region. The ablated holes have an area or diameter less than the area or diameter of the spot size. In the special case of diffraction limited spot size, the ablated hole has a size (diameter) less than the fundamental wavelength size. The present invention has produced laser ablated holes with diameters less than the spot diameter and with diameters 5% or less of the laser beam spot size.

This increased precision at shorter pulse widths is surprising. A large increase in damage threshold accuracy is observed, consistent with the non-linear avalanche breakdown theory. It is possible to make features smaller than spot size in the X-Y focal plane and smaller than the Rayleigh range (depth of focus) in the longitudinal direction or Z axis. These elements are essential to making features smaller than spot size or Rayleigh range. The Rayleigh range (Z axis) may be adjusted by varying the beam diameter, where the focal plane is in the X-Y axis.

The present invention demonstrates unexpected high precision in a new nanoscale regime. The sharpness and reproducibility of features, and independence of polarity and target material are not fully consistent with previous non-linear avalanche breakdown theory. While not wishing to be held to any particular theory, they are compatible with new theory described herein, in which breakdown is independent of multiphoton effects, and the ablated area does not vary with bandgap fluctuations.

It has been demonstrated that sub-wavelength holes can be machined into metal surfaces using femtosecond laser pulses. Earlier results (Mourou, U.S. Pat. No. 5,656,186) could be physically understood in terms of the thermal diffusion length, over the time period of the pulse deposition, being less than the absorption depth of the incident radiation, and the further principles described hereinabove. The interpretation is further based on the hole diameter being determined by the lateral gaussian distribution of the pulse in relation to the threshold for vaporization and ablation, more specifically explained below. However, according to this explanation, it is unexpected that femtosecond machining can be extended to much higher precision, even in large bandgap nonmetallic materials as in the present invention. The present invention describes a physical mechanism by which this can be accomplished, and demonstrates feasibility.

Figure 3A:
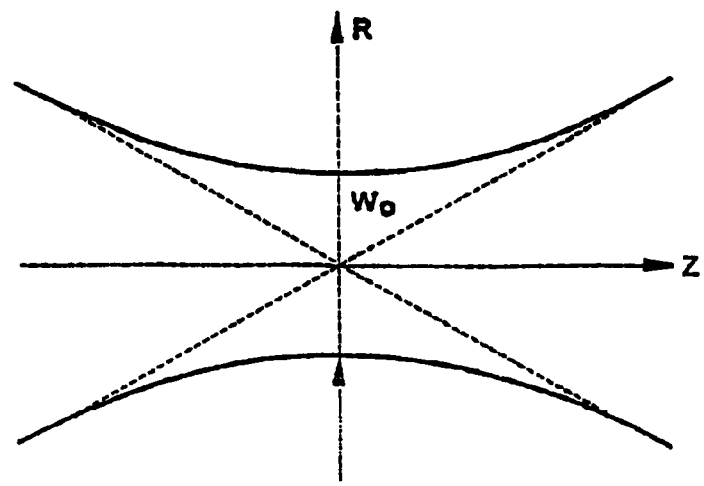
FIGS. 3A and 3B show that the laser intensity varies along the propagation axis.
Figure 3B:
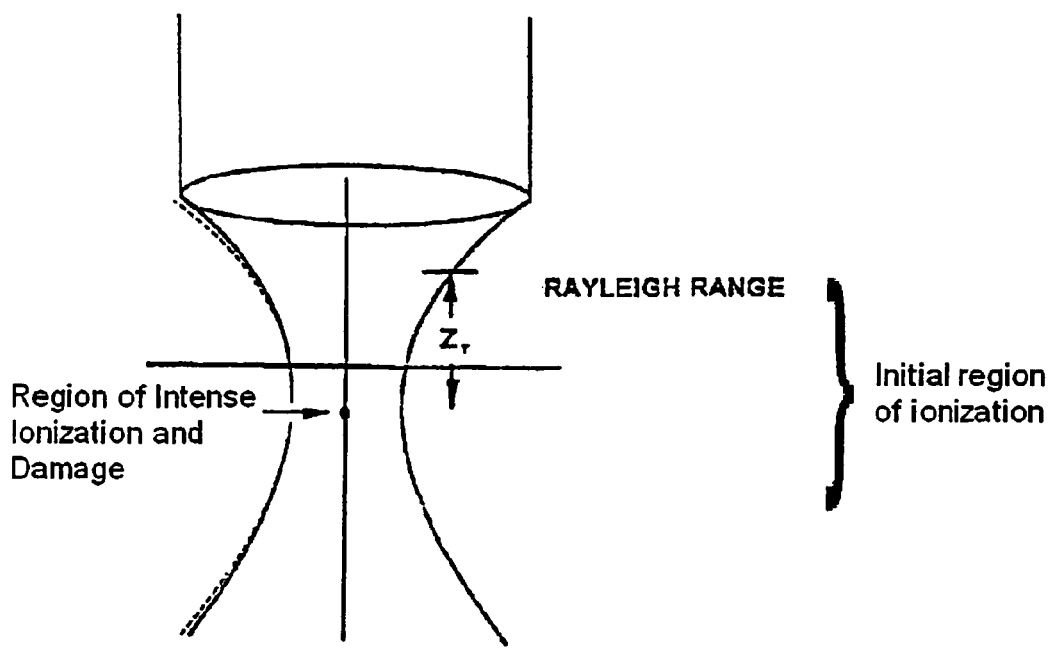

FIGS. 3A and 3B are schematic illustrations of beam profile along the longitudinal Z axis and sharing precise control of damage—dimension along the Z axis.

It was also observed that the laser intensity also varies along the propagation axis (FIGS. 3A and 3B). The beam intensity as a function of R and Z expressed as:

$$I((Z,R) = I_0/(1+Z/Z_R)^2 \cdot \exp(-2R^2/W^2_z)$$

where $Z_R$ is the Rayleigh range and is equal to $$Z_R = \frac{\pi W_0^2}{\lambda}$$

$W_0$ is the beam size at the waist (Z=0).

By the present invention, it can be seen that the highest value of the field is at Z=R=0 at the center of the waist. If the threshold is precisely defined it is possible to damage the material precisely at the waist and have a damaged volume representing only a fraction of the waist in the R direction or in the Z direction. It is very important to control precisely the damage threshold or the laser intensity fluctuation.

For example, if the damage threshold or the laser fluctuations known within 10% that means that on the axis (R=0)

$$I(O,Z)/I_0 = 1/(1+(Z/Z_R)^2 = 0.9$$

damaged volume can be produced at a distance $Z_R/3$ where $Z_R$ again is the Rayleigh range. For a beam waist of $W_0=\lambda$ then $$Z_R = \frac{\pi W_0^2}{\lambda} = \pi\lambda$$

and the d distance between hole can be expressed as $$Z_R = \frac{\pi\lambda}{3}$$

and as shown in FIGS. 3A and 3B.

The maximum intensity is exactly at the center of the beam waist (Z=0, R=0). For a sharp threshold it is possible to damage transparent, dielectric material in a small volume centered around the origin point (Z=0, R=0). The damage would be much smaller than the beam waist in the R direction. Small cavities, holes, or damage can have dimensions smaller than the Rayleigh range $Z_R$ in the volume of the transparent, dielectric material. In another variation, the lens can be moved to increase the size of the hole or cavity in the Z dimension. In this case, the focal point is moved along the Z axis between subsequent shots to increase the longitudinal dimension of the hole or cavity. These features are important to the applications described above and to related applications such as micro machining, integrated circuit manufacture, encoding data in data storage media, and intracellular surgery.

In the present invention, the process leading to the onset of optically induced damage in material is of critical importance in determining the flow of optical energy in the process and in the determining the resulting features. It has previously been observed and described that uncertainty in the fluence associated with the threshold of damage in various materials can be greatly decreased by employing short optical pulses in the picosecond and femtosecond timescale. The present invention demonstrates that damage on a scale much smaller than the wavelength of light is practical when the damage threshold is precisely determined in this regime.

However, a new method for optical induced breakdown and new understanding of the damage process, according to the present invention, leads to unprecedented improvements in feature size and in more tightly confined collateral damage.

The process of optically induced damage may be more easily understood in the context of dielectric materials. Parallels are then drawn to delineate the distinctions and similarities between dielectrics, semiconductors and metals. The process of the present invention is applicable to all materials. Thus, the present invention is applicable to transparent, opaque, biologic, non-biologic, organic, inorganic, metal, semi-conductor, among others. Best results are achieved with solids and non-solids that are densified. More broadly with regard to fluids, the process applies to liquids as stated and fluids having relatively uniform electron density; yet gasses are problematic.

In one aspect, a short pulse of light is concentrated to a simple focus within a transparent dielectric material with sufficient total energy to cause a permanent change to the material. As the leading portion of the pulse energy passes into the focal volume, it produces sufficient field strength in the material to cause electrons that are initially bound in the valence band of the material to be promoted to the conduction band. As the threshold fluence for this effect, called the Zener effect, is crossed in the spatial and temporal advancement of the optical pulse, a thin pillar of unbound charge is liberated in the highest fluence region within the pulse focus. With more energy being added to the material by the advancement of the optical pulse, additional electrons are liberated either directly by the optical field or less directly by the impact of unbound electrons driven by the light of the optical pulse. Consequently, the density of electrons increases in the region where the light is more intense. Eventually the density of the charges becomes sufficiently high as to enable the optical properties of the material to be greatly altered.

Most significantly, the strength of absorption of energy out of the light field and into the unbound electron bath is driven up more sharply where the density of unbound electrons is higher. This causes a shortening of the absorption depth. The absorption process then collapses to a depth limited by the accessible charge volume density. Thus, while the optical field may be capable of promoting electrons out of the valence band in a considerable range of depth, the absorption process proceeds in such a way as to concentrate the catastrophic release of bound charge in a minimal volume, resulting in damage to a volume that is one or more orders of magnitude smaller than the wavelength of the light in all dimensions.

In this process, lateral confinement of the damage is driven by localization of the seed charges to small dimensions and by a highly nonlinear cascading of the subsequent damaging process. Length-wise confinement of the damage along the Z axis is driven by a collapse of the absorption depth to a dimension significantly shorter than a wavelength. For a tightly focused beam, the difference between length-wise (Z) and lateral (X, Y) confinement is blurred, and both effects contribute to confinement in all directors. Practically, most materials have a volume density of atoms not far from $10^{23}/cm^3$. Laser radiation interacts at near-threshold intensities with the most accessible electrons. This is typically one electron per atom as a second electron is less likely to be promoted out of the valence band than valence electrons at neighboring sites, due to electric field shielding of the first unbound electron. The presence of the unbound electrons, promoted from the valence band by the Zener effect, causes absorption, reflection and shielding of incident light. Absorption of the light is one of the stronger components in most interactions. The depth of absorption of light in a neutral collection of unbound charges is described in terms of a plasma frequency and its relation to the optical frequency. With near optical frequencies and electron masses near the rest mass of an electron (in materials electrons may have effective mass less than their rest mass), the density of unbound electrons needed to block the transmission of light is about $10^{19}/cm^3$. At a density near this threshold the depth over which absorption occurs may be quite long. At densities near $10^{23}/cm^3$ the absorption depth is about 100 nm for 1-micron wavelength light. Thus, when damage occurs, it can be driven to scales easily an order of magnitude below the optical wavelength.

In semiconductors illuminated with light significantly below their characteristic bandgap, damage follows the lines of the dielectric model just described. In such material the Zener effect is the same or the level of the Zener effect will tend to be lower. If light is incident on a semiconductor with a photon energy very near to or above the bandgap energy, the light will directly promote electrons to the conduction band via the photoelectric effect. This causes the semiconductor to behave more like a metal, and directly exhibit a short absorption depth. The nonlinear cascading effects are of equivalent dependence or of less dependence. A significant enhancement in the disruption of the material takes place in regions of higher optical fluence when a collapse in the absorption depth takes place. In short, promotion of electrons into the conduction band by the Zener effect is augmented by direct promotion by photons. The scaling of threshold with bandgap in the case of silicon suggests cascading or avalanche occurs, with the degree of significance varying.

Lateral confinement of the damage in insulators, semiconductors, and metals to dimensions much smaller than the wavelength of the illuminating light is based on the disruption of the bonding structure of valence electrons. In any of these materials ultrashort optical pulses have the capability to produce damage with extremely low uncertainty and with low pulse energy. The energy fluence damage threshold was characterized based on the only portion of the material to be damaged being that which was illuminated at a fluence exceeding that threshold, leading to a transverse damage dimension about equal to or somewhat smaller than a wavelength. Now the new method of pulse shaping leads to a collapsing of the absorption depth to the transverse dimensions, with effective absorption near a Zener-seeded region to cause sharp localized enhancement of optical absorption and subsequent damage.

The damage process of the invention occurs in two parts involves two portions of an optical pulse. Under the influence of the first portion of the pulse the material is seeded for optical damage where the light is most intense. Under the influence of the second portion of the pulse the actual damage is driven in a smaller volume by preferential absorption of the remaining light.

Figure 4A:
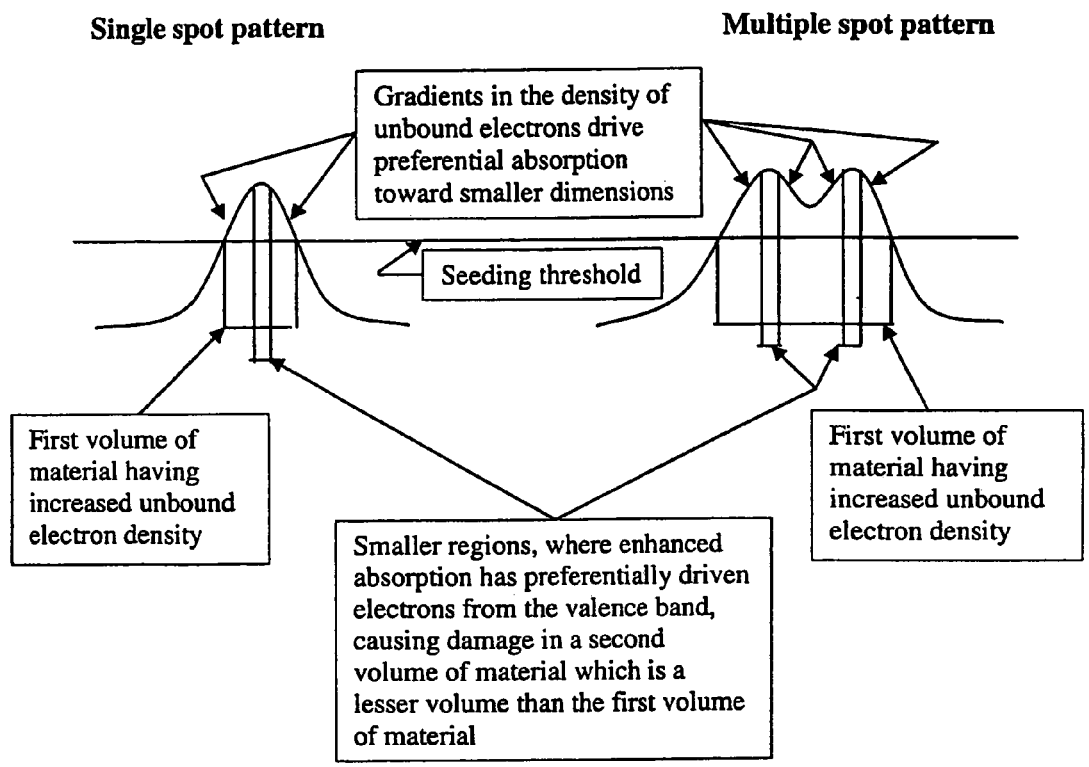
FIG. 4A is a schematic of density gradients in the single spot and multiple spot patterns, each generated by a single shaped optical pulse.
Figure 9A:
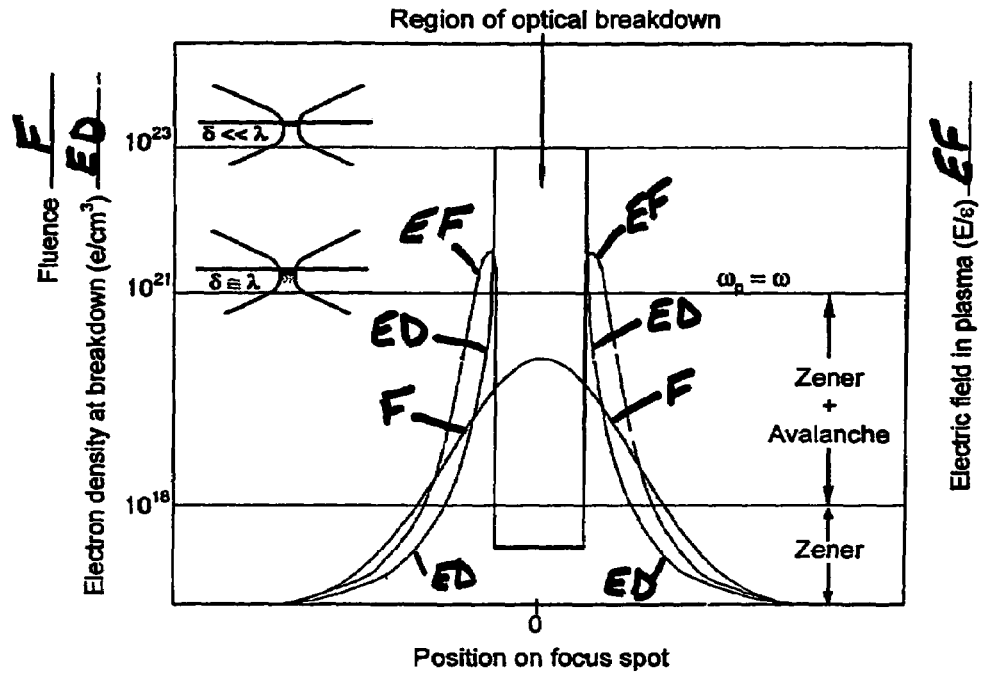
FIGS. 9A and 9B show schematic illustrations of the processes that lead up to material ablation over the interval of a laser pulse.

In its simplest form this process leads to a single damage spot with dimensions more than an order of magnitude smaller in size than the wavelength of the incident light. This is illustrated by the line crossing the spatial profile of a gaussian beam focus near its peak (see FIG. 4A, single spot pattern). FIGS. 2, 4A and 9A all show parameters as a function of position across beam waist. FIGS. 2 and 4A show fluence parameter and FIG. 9A shows fluence and other parameters. In FIG. 2, energy refers to fluence. Fluence refers to pulse energy per unit of area. That is, incident area in a direction traverse to the beam direction. Intensity refers to fluence per pulse direction. As the energy of the optical pulse arrives at the material, the field of the light produces unbound electrons where the threshold for production is exceeded. But, the mere production of unbound electrons is not sufficient to damage a material. The remaining portion of the pulse is preferentially absorbed in a decreasing volume, delivering the greatest concentration of absorbed energy in a collapsed volume of material: a volume approaching or limited by the penetration depth of optical radiation in a density of $10^{23}/cm^{3}$ of electrons.

A more complex pattern of illumination is used to obtain a specific pattern of damage (see FIG. 4A, multiple spot pattern). In this case, a single pulse is passed through an optical system to create a specific intensity pattern. The portions of the pattern that are most intense are capable of establishing regions where the density of unbound electrons is higher (step 1) and also of driving those regions into damage (step 2). It is the gradient in the density of unbound electrons that causes the subsequent reduction in the size of the damaged volume. Thus, it is necessary for the intensity modulation available in step 1 to instill a sufficient gradient in the density of unbound electrons to drive the subsequent concentration of absorbed energy to a smaller region.

In any damage event, the threshold for damage is defined by a loss of structure in the bonds formed by valence electrons. The present method provides optically damaged spots very significantly smaller than a wavelength. The spots may be formed in isolation, or in specific patterns. The damages spots are produced sequentially or simultaneously.

Note that because the energy damage threshold of the materials is deterministic, and the definition of the damage region is self sharpening, it is not necessary to obtain full optical resolution according to the conventional definitions. Modulation profiles with reduced visibility may be used to define multiple-damage profiles or patterns. Such profiles themselves may be generated with peak-to-peak spacing well below a wavelength.

Figure 4B:
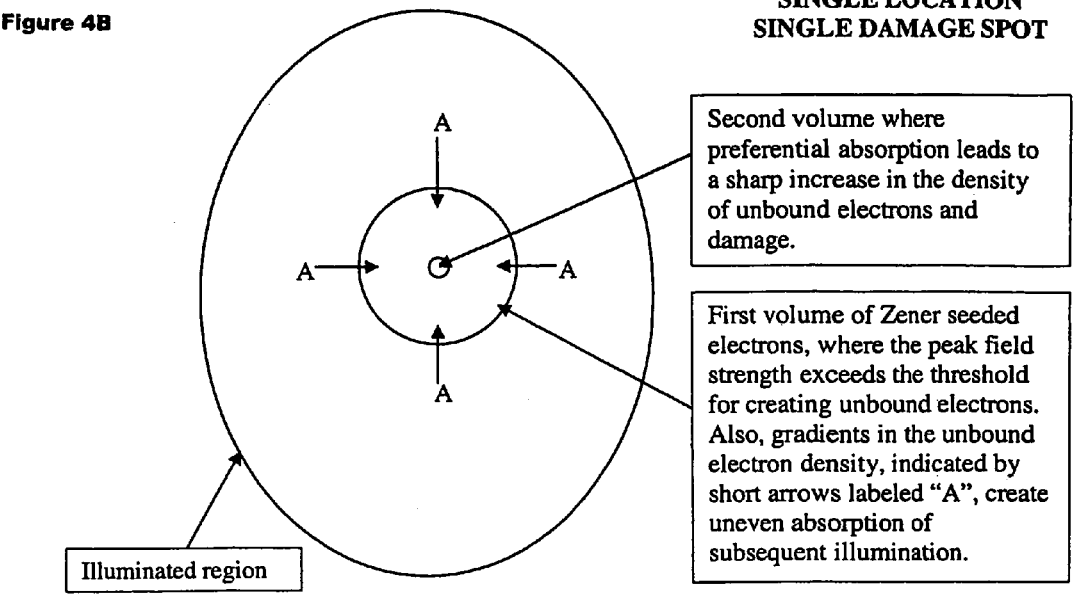
FIG. 4B is a sketch illustrating single and multiple damage spots according to the invention and as illustrated in FIG. 4A.
Figure 4B:
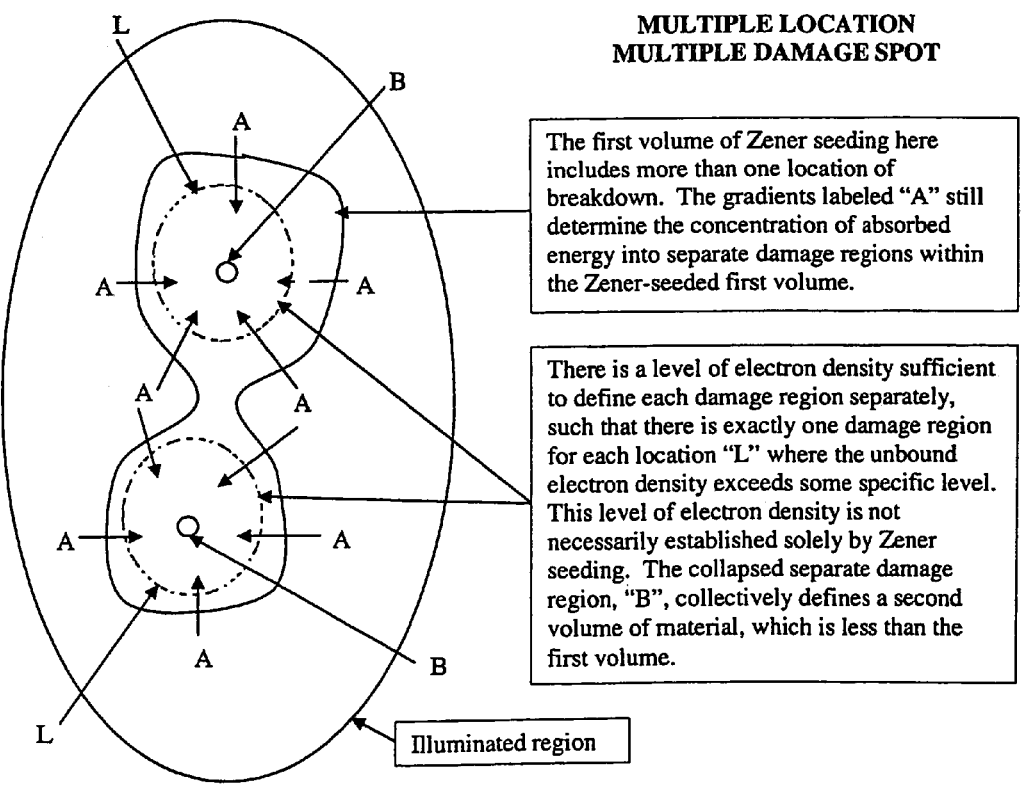

In FIG. 4B, there is a single spot illustration showing three circles. The outer circle is the illuminated region; the middle circle is the first volume having Zener seeding; and the inner most circle is the damage volume, which is a second volume of material less than the first volume of material.

In FIG. 4B, there is also a multiple spot example. The outer circle shows the illuminated region; the FIG. 8 shape defines the first volume of Zener seeding; the gradients associated with the first volume are labeled "A"; separate locations or centers, "L," are illustrated by dashed circles; and the collapsed separate damage regions, "B," collectively define a second volume, which is less than the first volume.

Figure 5:
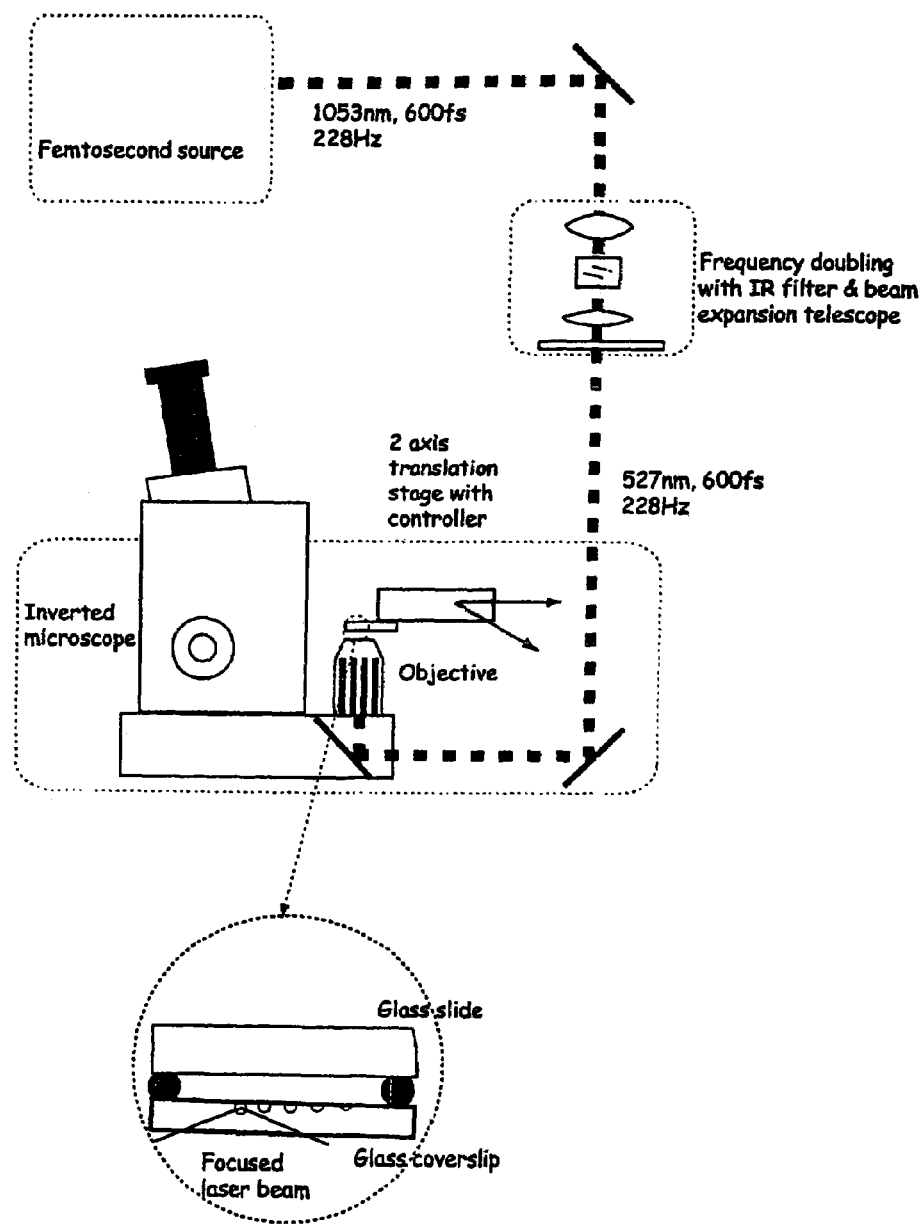
FIG. 5 shows an experimental set-up of nanoscale machining.

FIG. 5 shows experimental set-up of nanoscale machining. These experiments were performed with a directly diode-pumped Nd:glass, CPA laser system (Intralase Inc.) operating at 1053 nm, with 30 mW average power at a repetition rate of 1.5 kHz and a pulse width of 600 fs. The laser beam (at 1053 nm or frequency doubled with a KTP, type I crystal (Cleveland Crystals) was expanded to overfill the back aperture of the objective. It was then brought into the epifluorescence path of an inverted microscope (Axioverte 225, Carl Zeiss inc.) and focused by one of the two objectives: Zeiss Neofluar 1.3 NA, 100× objective or 0.65 NA, 40× (Carl Zeiss Inc.). Five materials, in the form of cover slips, were used: Corning Glass 0211, Single Crystal Quartz (Ted Pella), Fused Silica, Sapphire, or Silicon. The surface of a cover slip was cleaned with an air-duster prior to machining. The cover slip was then mounted on a glass slide with double-sided tape. The slide was secured to a computer-controlled, two axis motorized stage, or a three axis nanopositioning stage, fastened to the microscope stage. The surface of the cover slip being machined was imaged to obtain visual feedback while machining. With the 1.3 NA, oil immersion objective, the laser beam was focused on the surface distal to objective to avoid the oil-glass/quartz interface. With the 0.65 NA, air objective, machining was carried out on the surface immediately facing the objective. The repetition rate of the laser and the speed of the stage were adjusted to get a reasonable separation between adjoining features. The average power of the beam was measured prior to the dichroic mirror used to reflect the beam into the back aperture of the objective, and was varied at the source or with a reflective variable density filter.

Figure 6A:
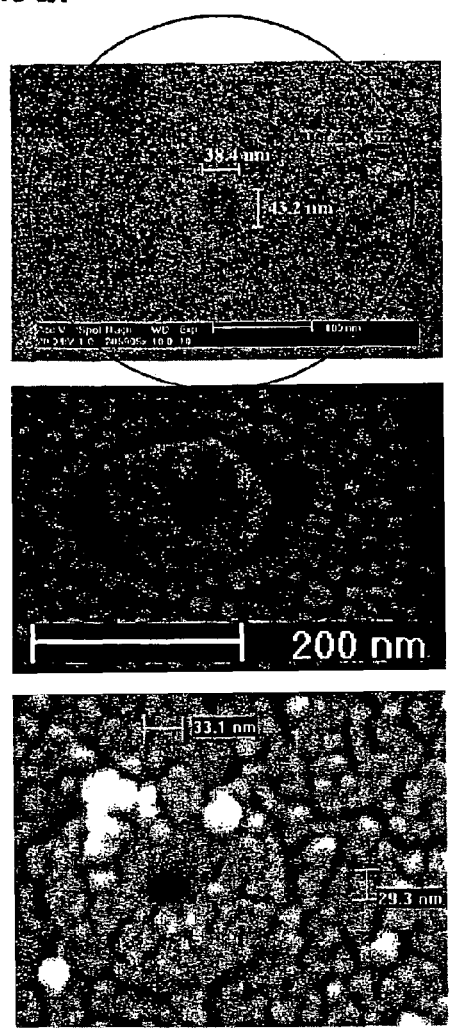
FIG. 6A shows nanometer size holes produced with NA 1.3 and 527 nm light, where targets of Corning™-211 glass were mounted slightly inclined, and scanned perpendicular to the beam such that subsequent pulses encountered targets that were typically displaced ~2 μm in the plane of focus, and ~10 nm in the Z-axis. Images are features scanned by SEM. The smallest holes were generally found near the beginning of a line of features, near the point in a scan at which the target first encounters the laser focus. Subsequent panels show that holes were sometimes accompanied by surrounding features; often a raised region immediately around the holes surrounded by a circular or elliptical dip.

FIG. 6A shows some examples of nanometer-scale holes.

Figure 6B:
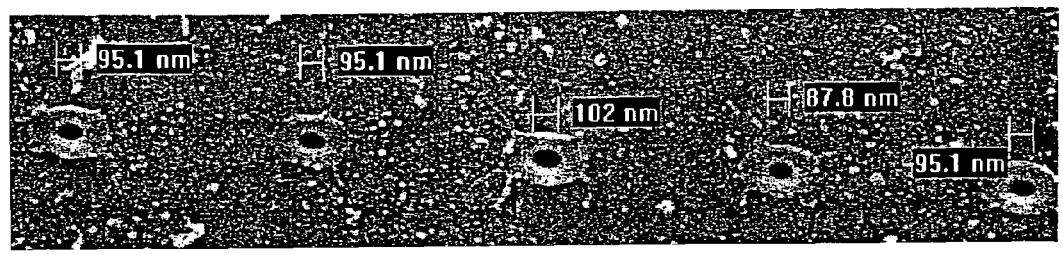
FIG. 6B also shows, in addition to their minute scale, at a given pulse energy the holes are essentially identical in dimension.

FIG. 6B shows scanning electron micrograph (SEM) of a row of holes in glass. Samples were coated after laser machining with either gold or Palladium to a thickness of ~10-20 nm in a sputter-coater. SEM analysis was done on a Philips XL30 FEG microscope. Size measurements were carried out manually with an in-built function in the microscope control software In operation a directly diode-pumped Nd:glass, CPA laser system operating at 1053 nm, with a repetition rate of 1.5 kHz and a pulse width of (600) fs was focused through the objective of an inverted microscope (FIG. 5), as described above. The smallest holes were created by frequency doubling and expanding the beam to fill the back aperture of a 1.3 numerical aperture oil-immersion objective, which formed a focus on the far side of the target, i.e., glass or quartz coverslips.

In some cases, targets were mounted slightly inclined, and scanned perpendicular to the beam such that subsequent pulses encountered targets that were typically displaced ~2 µm in the plane of focus, and ~10 nm in the Z-axis (FIG. 6A). The displacement in the Z-axis from end to end of a row of holes was about the same as the largest hole diameters, indicating that they were created when a roughly spherical region at the laser focus encountered the surface of the target (data not shown). The smallest holes, e.g., FIG. 6A, were generally found near the beginning of a line of features, near the point in a scan at which the target first encounters the laser focus. By reducing the pulse energy to ~4.5 nJ, slightly above the threshold (~4 nJ in Corning 211 glass) below which features vanish, the present invention consistently machined circular holes as small as 20 nm, and in some cases as small as 18 nm or 15 nm. Even at these minute scales, the features have sharply delineated edges, suggesting that even smaller holes could be achieved using shorter wavelengths, and/or approaching even closer to threshold. Holes were sometimes accompanied by surrounding features; often a raised region immediately around the holes surrounded by a circular or elliptical dip, e.g., FIG. 6A, panels 2 & 3.

In addition to their minute scale, the holes are also striking in their reproducibility (FIG. 6B); even when the smallest holes are produced with a pulse energy within 10% of threshold, every pulse creates an identically sized hole (with measurement error of about 10% for 20 nm). That is, the size varies by only about 10%, generally less than 5%, preferably less than 4% and as low as 3½% or less. This amazing consistency indicates that the initial charge carriers that seed avalanche ionization must be created in a very reproducible manner. Such carriers have been theorized to be either pre-existing, or arise from multiphoton ionization or tunneling of electrons through the atomic field potential barrier which is suppressed by the strong electric field of the intense light (Zener ionization). Pre-existing carriers cannot explain our results; producing holes of such small scale and sharp (<5 nm) edges with regularity and precision would require $10^{18} e/cm^{3}$ free electron densities, far higher than present in large bandgap materials.

To discriminate between the later possibilities we compared optical breakdown by linearly and circularly polarized pulses in three materials with bandgaps ranging from 1 eV for silicon and 10 eV for sapphire. When using tightly-focusing high NA objectives these comparisons are difficult due to difficulty assuring that the Z-axis position of laser focus is the same. For example, the data shown in FIG. 7A was taken by measuring the hole and feature diameters near the center of scanned rows at different pulse energies. The threshold appears different for the holes and the surrounding features, suggesting that the laser focus was somewhat below the surface; at low energy the region of optical breakdown becomes small enough that it no longer penetrates the surface, only the surrounding features are visible. When experiments were performed using an air objective with a longer depth of focus (NA=0.65), the threshold is revealed to be the same for the holes and the surrounding features (FIG. 7B). Assuming that the size reflects thresholding of the gaussian intensity profile of the focused spot (see FIGS. 7A and 7B we fit the feature and hole size data to $$D = \sigma \sqrt{8\ln\left(\frac{E}{\gamma}\right)},$$

where D is the diameter, E is pulse energy, γ and σ are fitted parameters: γ gives the threshold energy. The same threshold was indicated by fits to the features and the holes.

Figure 7A:
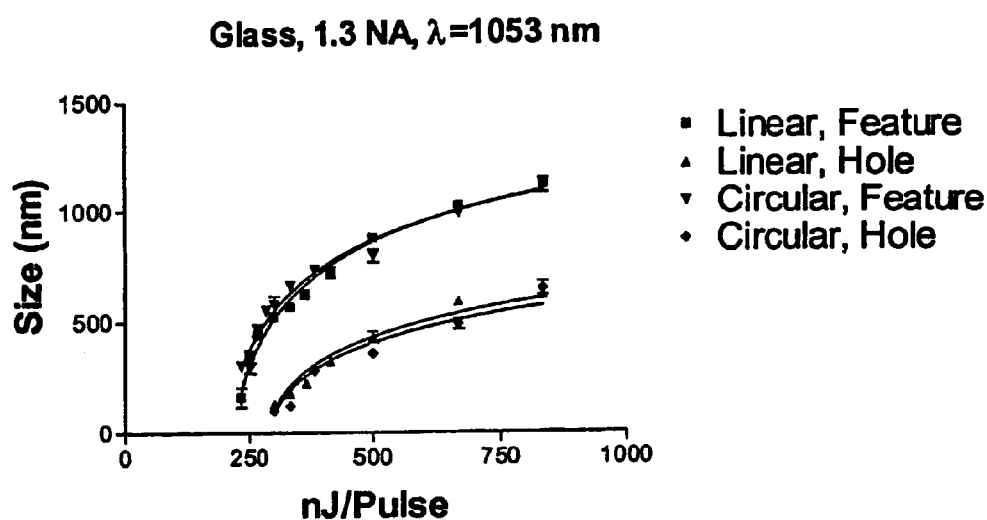
FIGS. 7A and 7B show that the size of the holes and the surrounding features decreases with pulse energy down to a sharp threshold below in which no changes are observed.
Figure 7B:
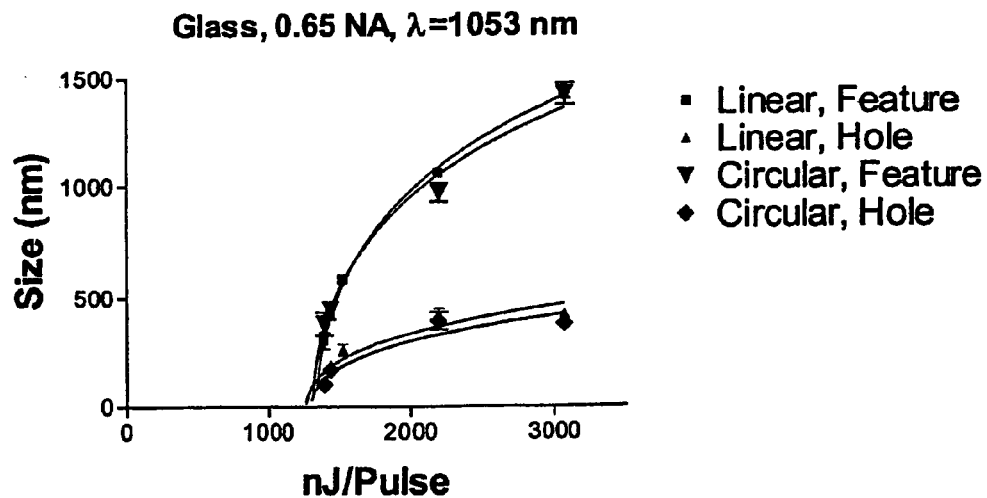

More particularly, FIGS. 7A and 7B show that the size of both holes and the surrounding features decreases with pulse energy down to a sharp threshold below which no changes are observed. Data is fit to:

$$\text{diameter} = \sigma \sqrt{8\ln\left(\frac{E}{\gamma}\right)},$$

the expected relation given the gaussian intensity profile of the focused spot. The 1053 nm pulses focused on glass by a 0.65 NA objective. The pulse energy arriving at the sample is substantially less since the objective is not optimized for near-infrared. The 527 nm pulses focused on glass by a 1.3 NA objective. For comparison the measurements were made near the center of each row of features created at different pulse energies. This excluded the smallest holes, which were found near the ends of each row.

In other words, the diameter of both holes and the surrounding features decreases with pulse energy down to a sharp threshold below which no changes are observed. In FIGS. 7A and 7B, results for linearly and circularly polarized light are shown. Data is fit with $$\text{diameter} = \sigma \sqrt{8\ln\left(\frac{E}{\gamma}\right)},$$

where E is pulse energy, γ and σ are fitted parameters. In FIG. 7A, 1053 nm pulses focused on glass by a 1.3 NA objective. The pulse energy arriving at the sample is substantially less since the objective is not optimized for near-infrared. FIG. 7B 1053 nm pulses focused on glass by a 0.65 NA objective.

Figure 8:
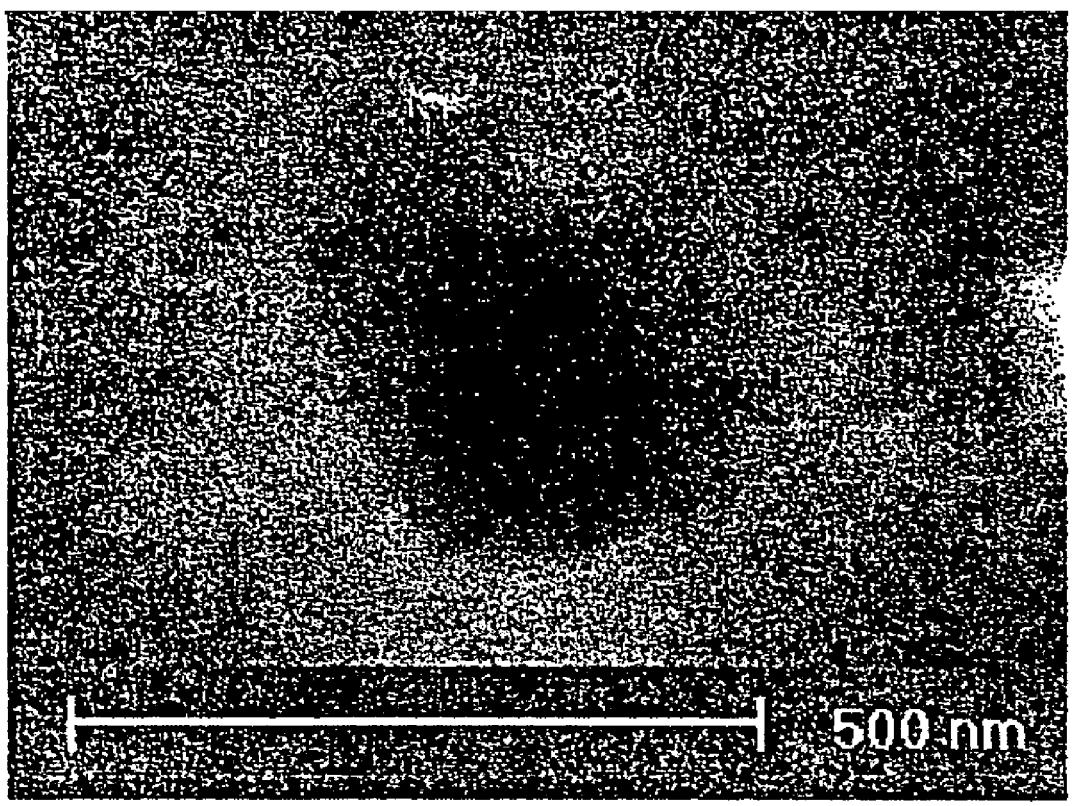
FIG. 8 shows well-defined ablations in a cell membrane.

FIG. 8 shows an SEM of a hole in a cell membrane. CHO cells were cultured on coverslips and fixed with gluteraldehyde before laser ablation by 1053 nm pulses focused through a 1.3 NA objective. Tests were also conducted on silicon, quartz, sapphire, and fused silica with similar favorable results, even smaller holes could be produced by using shorter wavelength light.

As duration of a pulse is very short, free charge carriers must be produced rapidly and reproducibly. In quartz and silicon, which have well-defined bandgaps, reproducibility is less surprising. But the bandgap structure of glass is more variable, yet this is not reflected in the structure of features produced by optical breakdown. Without being held to any particular theory, it appears that within the region of optical breakdown the number of carriers produced is sufficiently large as to always exceed the minimum required to seed complete ionization through Zener and avalanche mechanisms.

Measured by AFM, the depth of holes in glass produced by near threshold fluence at an approximately 2 micrometers (nm) focus spot size was ~50 nm. As light absorption occurs over the depth of highly ionized material, this represents the upper bound of the plasma skin depth. This is on the order of the predicted ~30 nm skin depth if all $10^{23}$ cm$^{-3}$ valence electrons are ionized, indicating complete ionization in the region of the holes.

By the present invention, a methodology for high-precision laser machining features of unprecedented small (nanometer) size has been developed. The present invention's approach takes advantage of the highly non-linear dependence of optical breakdown on intensity, coupled with extremely tight focusing by high numerical aperture objective, to create features that are over an order of magnitude smaller than the wavelength of light. By adjusting the laser power, it can reproducibly create holes as small as or smaller than 20 nm with little variation from one hole to the next (<5%). Because little power is required (each pulse is ~4-10 nJ) it is a simple matter to form more complicated structures by repeatedly machining holes at different locations; for example, by the present invention pipes and channels have been machined many microns long by repeatedly firing pulses at a glass target while displacing its X, Y, and Z-axis position (see FIG. 11). For more rapid processing, the focus of multiple beams could be simultaneously scanned in three dimensions. The technique is versatile; it does not require specific target materials and is relatively easy to execute, and for many applications it is simpler, more reliable, and more versatile compared with other methods capable of producing features on this size scale, e.g., e-beam lithography and nanoimprinting.

This enabling technology has potentially broad applications for MEMS construction and design, microelectronics, optical wave-guides, microfluidics, materials science, microsurgery, optical memory, and creating structures to interface with cells and biological molecules. It can also extend the utility of ultrafast lasers in biology. We have applied ultra-high-precision laser machining to produce well-defined ablations in cells (FIG. 8), and anticipate that it will have great impact in the biological sciences, including research in cell motility, development, growth-cone and neurite extension, and targeted disruption of genetic material.

To assure that the scale of features was not affected by small variations in the Z-axis position of the laser focus, comparisons between materials were made using the low NA objective. Reproducible features were created in quartz, silicon, fused silica, sapphire, and Corning 0211 glass using 1053 or 527 nm light. At 527 nm the threshold energy for quartz and glass was 10 times greater than silicon; at 1053 nm the threshold for quartz was ~25% less than glass, and about 5 fold greater than silicon (Table I). The threshold intensities and thus the electron quiver energy approximately scale with the band-gap, suggesting that breakdown is indeed an avalanche process. In all cases the threshold was independent of the polarization. Since circularly polarized light is extremely inefficient for producing multiphoton processes, these results largely exclude multiphoton ionization as a source of initial charge carriers. Thus avalanche ionization is principally seeded by electron tunneling.

Given that electron tunneling seeds avalanche ionization, and without wishing to be held to any particular theory, the following is thought to apply. The deterministic nature is especially surprising in glass, where the variability of the band-gap structure is not reflected in the structure of features produced by optical breakdown. This can be explained if observable damage occurs only when the quiver energy is significantly beyond the critical ionization energy: damage depends on transition from strongly under critical free electrons density (i.e. zero) to supercritical. The carriers are first created in a confocal volume at or near the surface by single photon absorption or tunneling and not in a significant way by multiphoton excitation. When the carrier quiver energy given by $$E_{OSC} = \left\langle \frac{e^2 E^2}{2m\omega^2} \right\rangle \text{ or } E_{osc} = 9.310^{-14} I\lambda^2$$

becomes greater than the band-gap the carriers are further multiplied by impact ionization. The time between collisions τ decreases as the electron energy increases to become of the order of 100 attoseconds for eV energy. The increase in free electron density sharply augments the plasma frequency $\omega_p$, and will decrease the dielectric constant to near zero when the plasma frequency reaches the laser frequency.

$$\varepsilon = 1 - \left(\frac{\omega_p}{\omega}\right)^2 \text{ with } \omega_p^2 = \frac{4\pi n e^2}{m}$$

The electric field in the plasma is equal to E/ε. So, when the plasma frequency becomes close to the laser frequency ω, the electric field experiences a strong enhancement, further increasing impact ionization, and producing a run away process that will stop when all the valence electrons are ionized. When the plasma frequency becomes greater than the laser frequency ($\omega_p > \omega$) the electric field in the plasma drops, and the plasma becomes strongly absorbing. The light won't propagate and will be absorbed over the skin depth δ given by $$\frac{c}{\omega_p} < \delta < \frac{c}{\omega_p (2\omega\tau)^{1/2}}$$

Figure 9B:
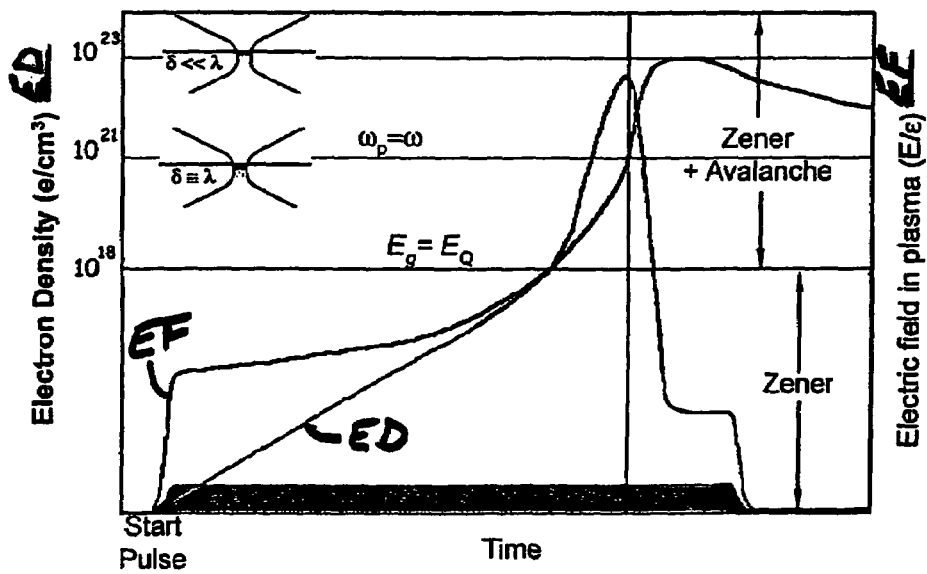

For $10^{23}$ e/cm³ this skin depth or penetration depth is of the order of 30 nm. The impact depth of 50 nm that we measured is an upper bound of the skin depth. The depth of features indicates that damage occurs when the ionized electron density is approximately equal to the density of atoms; that is, one valence electron is ionized from every atom valence electrons are ionized. FIGS. 9A and 9B schematically illustrate the time course of these events.

The finding that damage is governed by the valence electron density reveals the feasibility of UHPLM; it can work with any material even if the bandgap is ill-defined or variable. Since 10 n 23 e/Cmn³ electrons are ionized in the region of material damage, the smallest achievable scale will ultimately be limited by the skin depth and/or the diffusion of ionized electrons out of the region of breakdown. The latter limit can be estimated at ~10 nm, and since it depends on the pulse length, even smaller features are attainable using shorter pulses.

Thus the physics of UHPLM are extremely well-suited for a broad range of applications requiring discrete high-precision material modification, such as MEMS construction and design, ultra high density microelectronics, nanofluidics, materials science, optical memory, creation of structures to interface with cells and biological molecules, and targeted disruption of intracellular structures, and for many applications it is simpler and more reliable compared with other methods capable of producing nanometer features (e.g., electron-beam lithography and nanoimprinting).

FIG. 9A is a schematic illustration of the processes that lead up to material ablation within the focus of a laser pulse. The electron density is indicated on the left axis, and by the line ED. The F line indicates the profile of fluence across the gaussian focus spot. The electric field in the region of ionization (plasma) at the onset of material damage (breakdown) is indicated by the EF line. The fluence F and the electric field lines EF indicate relative changes; actual values are not given. The insets graphically illustrate the decreasing skin depth (δ) that the laser penetrates (skin depth) as the free electron density increases (the shaded areas indicate free electrons in the dielectric). The skin depth becomes approximately equal to the incident wavelength (λ) at $10^{21}$ e/cm³, as illustrated in the lower inset. The plasma frequency $\omega_p$ increases with the free electron density. As $\omega_p$ approaches the laser frequency the electric field experiences a strong enhancement and all valence electrons are rapidly ionized. This transition causes the material to become heavily absorbing over a skin depth that is much smaller than the wavelength (λ), as indicated in the upper inset, and it is quickly vaporized.

FIG. 9B is a schematic illustration of the processes that lead up to material ablation over the interval of a laser pulse. The shaded region at the bottom indicates the duration of the laser pulse. The electron density ED is indicated on the left axis, and by the ED line. The changing electric field in the region of ionization (plasma) is indicated by the EF line. When the field is such that the electron quiver energy is below the bandgap ($E_Q < E_g$), free electrons are produced only by Zener ionization. When the electron density passes ~$10^{18}$/cm³, the quiver energy exceeds the bandgap, and avalanche ionization begins. This process takes place over the skin depth (δ) that decreases as the electron density increases, becoming approximately equal to the incident wavelength (λ) at $10^{21}$ e/cm³, as illustrated in the lower inset. As the plasma frequency $\omega_p$ approaches the laser frequency the electric field experiences a strong enhancement and all valence electrons are rapidly ionized. This transition causes the material to become heavily absorbing over a skin depth that is much smaller than the wavelength (λ), as indicated in the upper inset, and it is quickly vaporized.

TABLE I

Optical Breakdown Thresholds Using Linear and Circularly Polarized Light

| Material | λ (nm) | Linear (nJ) | Circular (nJ) |
| --- | --- | --- | --- |
| Corning 211 | 527 | 59 ± 3 | 62 ± 3 |
|  | 1053 | 1271 ± 75 | 1305 ± 84 |
| Quartz | 527 | 62 ± 2 | 56 ± 4 |
|  | 1053 | 950 ± 57 | 933 ± 88 |

TABLE I-continued

Optical Breakdown Thresholds Using Linear and Circularly Polarized Light

| Material | λ (nm) | Linear (nJ) | Circular (nJ) |
| --- | --- | --- | --- |
| Silicon | 527 | 5.8 ± 1.1 | 6.1 ± 1.1 |
|  | 1053 | 172 ± 24 | 194 ± 20 |
| Sapphire | 527 | 68 ± 3 | 75 ± 5 |
|  | 1053 | 1774 ± 34 | n.d. |
| Fused Silica | 527 | 49 ± 2 | 57 ± 4 |
|  | 1053 | 907 ± 189 | 1063 ± 29 |

In another aspect, the invention provides a method to create nanoscale features with reduced or essentially no collateral damage. This aspect is best understood in contrast to present methods. Typically, an ultrafast laser beam is focused onto a target substrate, and the substrate surface is scanned through it to machine features in the desired pattern. This process is complicated by the deposition of the debris formed during the process of optical breakdown in the region surrounding the features; that is, deposits surrounding the holes such as in FIG. 10A. This is a two-fold complicating effect: (1) the resulting features are harder to control; and (2) the surrounding area is left with debris, which might be undesirable.

Figure 10:
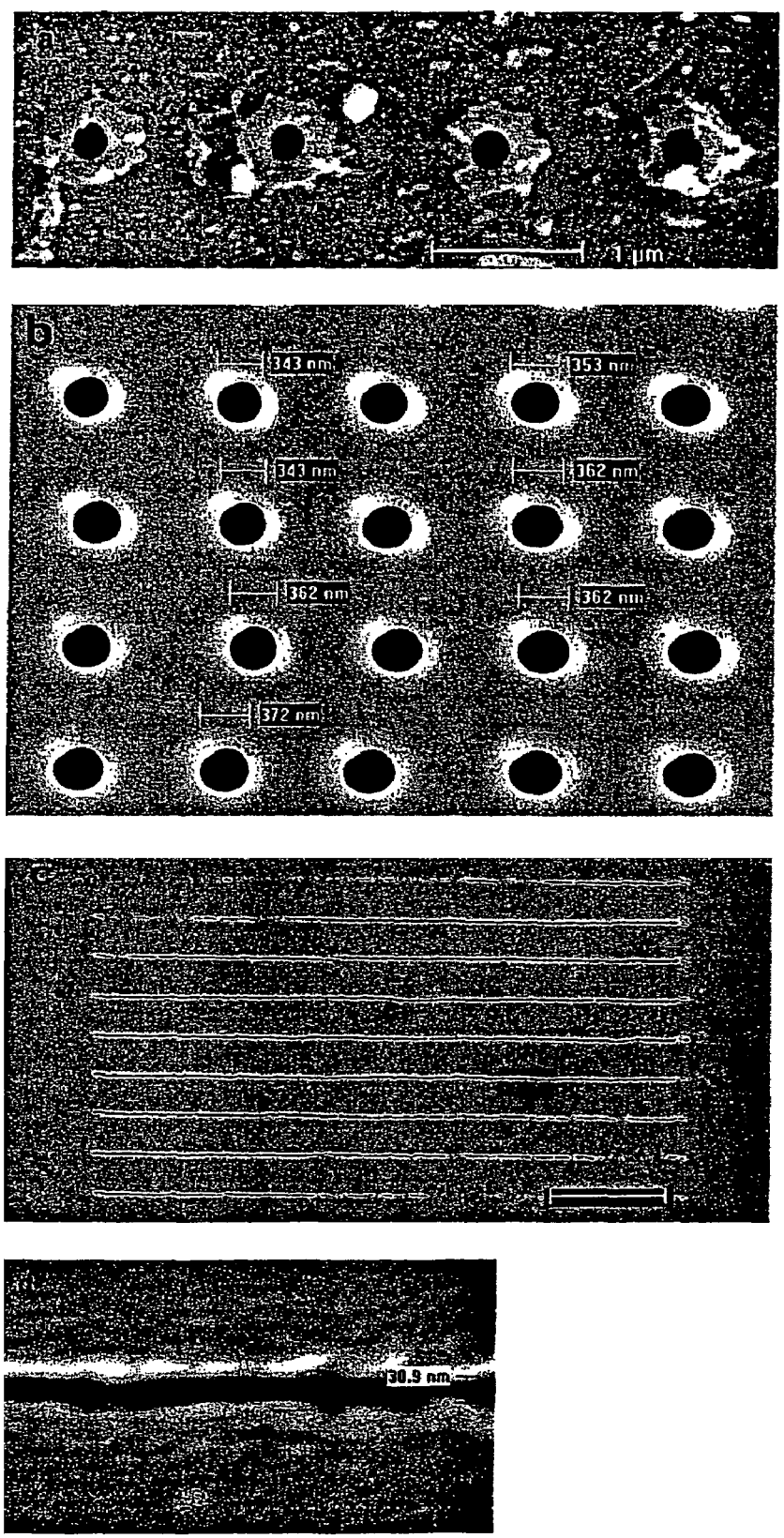
FIG. 10 shows surrounding features are redeposited material extruded from ablated region. (A) Scanning electron micrograph (SEM) of a row of holes in glass. Prior to viewing, the sample was blasted with pressurized gas, causing pieces of the surrounding feature to break off revealing a flat surface below (arrows). (B) SEM of an array of holes in glass produced at a glass-water interface. Note that features surrounding the holds are suppressed or absent. (C) A ~30 nm wide channel machined in glass. A channel was produced by scanning laser scanning the sample through the laser focus with the help of a piezoelectric nanostage (Made City Labs, Inc., Madison, Wis.), so that the successive pulses hit the sample 50 nm apart.

The process of the invention avoids this problem of deposition. Micromachining was carried out at a substrate target surface in the presence of an entrained fluid, such as immersed in water, so that redeposition of debris is prevented. The entraining fluid, water, helped to quench the ionized debris and carry it away (FIG. 10B). FIG. 10C shows an ~30 nm wide channel machined in glass, and FIG. 10D shows a detailed section of the SEM of FIG. 10C.

This process leads to sharp and clearly defined features without altering the surrounding material. For these reasons, this technique is a tremendous improvement in almost all micro fabrication processes using femtosecond lasers. The process can be varied for large scale micromachining by maintaining a flow at the interface or selecting fluids, liquids and gases appropriate to the manufacturing process. Depending on the substrate being micromachined, a variety of fluids are used which serve the dual purpose of imparting a desired treatment to the surface, while serving to keep it clean of debris generated during micromachining.

The technique provides great improvement to laser micromachining used in MEMS, microelectronics, micro/nanofluidics, fabricating optical memory, and for ultra high density microelectronics or optical memory fabrication, since it leaves the adjacent substrate surface unmarred and usable for further processing. It assists nano-fluidics fabrication by serving to keep the machined channels open by carrying away the debris as it is generated.

Figure 11:
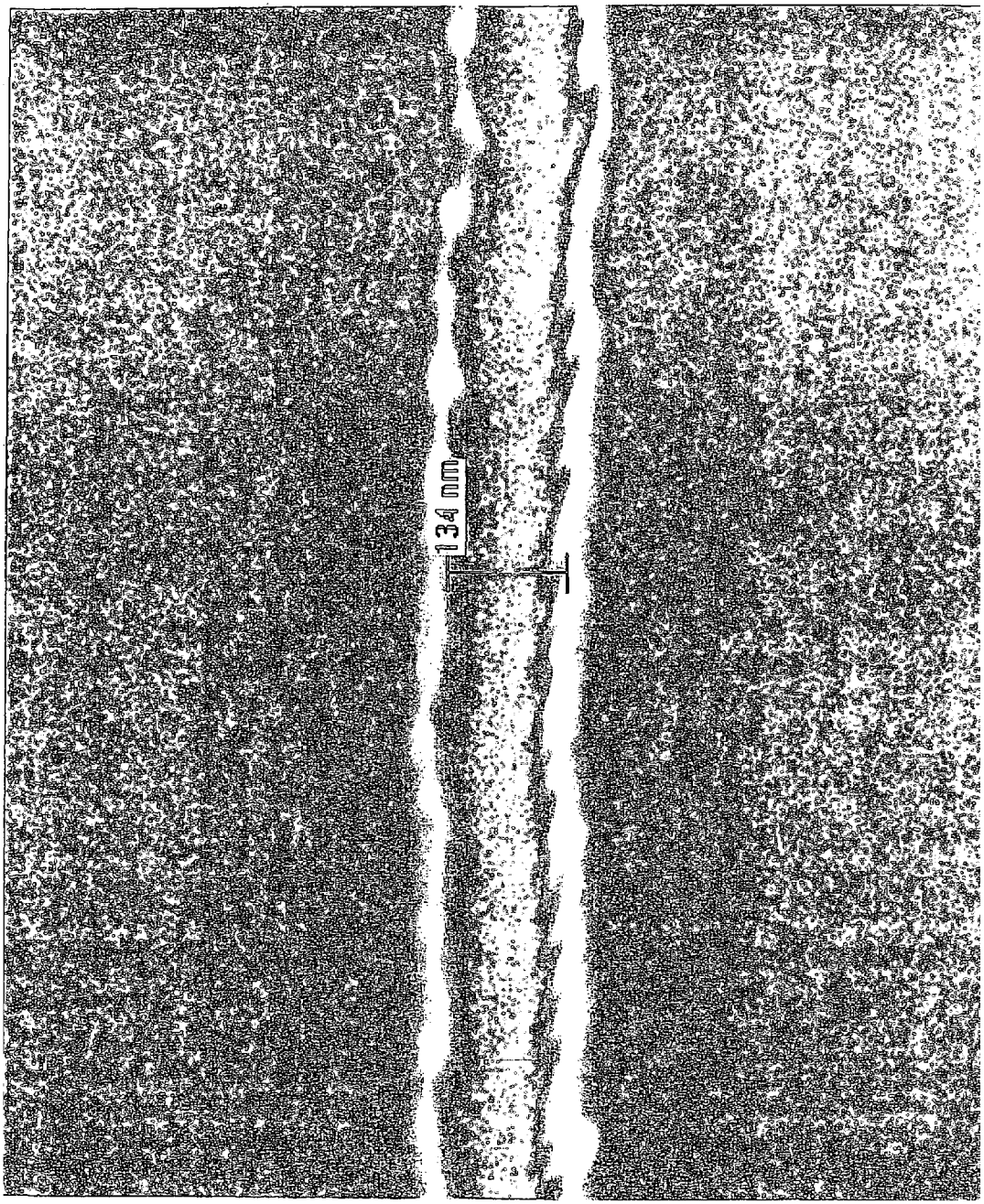
FIG. 11 is an SEM of a 134 nanometer groove feature formed in Corning™-211 glass while immersed in water.

FIG. 11 shows an SEM of a 134 nm groove manufactured in water. The channel is essentially a clean and adjacent surface free of debris.

Advantageously, the invention identifies the regime where breakdown threshold fluence, and the ablation dimensions do not follow the local bandgap variations, and makes use of such regime to provide greater precision and reproducibility of laser induced breakdown, and to induce breakdown in a preselected pattern in a material or on a material. The invention makes it possible to apply laser machining in a regime where nanometer-scale features are consistent in size, sharp-edges, and reproducibility.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A method of producing one or more features of micrometer size or less in a material comprising:
   generating at least one laser pulse of femtosecond duration or less,
   directing said pulse to a material to deposit enemy in the material to extract electrons from a valence band providing unbound electrons at a density sufficient to define a first absorption volume, and
   directing said pulse to the material to deposit added energy within at least a portion of the first absorption volume causing contraction of said first absorption volume to a smaller second absorption volume, thereby causing damage of the material selectively within said second absorption volume essentially without collateral damage to the balance of the material in said first absorption volume in the presence of an entraining fluid that entrains debris caused by such damage.

2. The method of claim 1 wherein the material has a surface, the pulse is directed to the surface, and the entraining fluid moves along the surface.

3. The method of claim 1 wherein the entraining fluid is a liquid bath that is essentially quiescent.

4. The method of claim 1 wherein the entraining fluid is a gas.

5. The method of claim 4 wherein the gas is moving and exerts a force sufficient to entrain the debris.

6. The method of claim 1 wherein the entraining fluid is essentially quiescent and has a density sufficient to entrain the debris.

7. The method of claim 1 wherein the entraining fluid is moving and exerts a force sufficient to entrain the debris.

8. The method of claim 1 wherein the entraining fluid is water or liquid hydrocarbon.

9. The method of claim 1 wherein the material is submersed in the fluid.

10. The method of claim 1 wherein said features are nanoscale features having at least one dimension less than a micrometer.

\* \* \* \* \*

UNITED STATES PATENT AND TRADEMARK OFFICE
CERTIFICATE OF CORRECTION

| | |
|---|---|
| PATENT NO. | : 7,560,658 B2 |
| APPLICATION NO. | : 11/167463 |
| DATED | : July 14, 2009 |
| INVENTOR(S) | : Alan J. Hunt et al. |

Page 1 of 1

It is certified that error appears in the above-identified patent and that said Letters Patent is hereby corrected as shown below:

Title Page, No. (75), Inventors, second inventor, "Gerald Mourou" should be --Gerard Mourou--.

Column 5, line 39, "damage" should be --damaged--.

Column 9, line 56, "directors" should be --directions--.

Column 11, line 23, "damages" should be --damaged--.

Column 11, line 54, "inc." should be --Inc.--.

Column 12, lines 15-16, after "software", insert --.--.

Column 17, line 28, "entrained" should be --entraining--.

Column 18, line 20, Claim 1, "enemy" should be --energy--.

Signed and Sealed this

Tenth Day of November, 2009

David J. Kappos
*Director of the United States Patent and Trademark Office*